April 14, 1925.

C. B. REDRUP

PISTON RING

Filed April 14, 1924

1,533,946

Inventor
C. B. Redrup
By Marks & Clerk
Attys.

Patented Apr. 14, 1925.

1,533,946

UNITED STATES PATENT OFFICE.

CHARLES BENJAMIN REDRUP, OF LEEDS, ENGLAND, ASSIGNOR TO PERCY REGINALD GREENWOOD, OF LONDON, ENGLAND, AND FRANK MITCHELL, OF LONDON, ENGLAND.

PISTON RING.

Application filed April 14, 1924. Serial No. 706,571.

*To all whom it may concern:*

Be it known that I, CHARLES BENJAMIN REDRUP, a British subject, and residing at "Heather View," Lawnswood, Leeds, in the county of York, England, have invented certain new and useful Improvements in Piston Rings, of which the following is a specification.

This invention relates to piston rings of the kind having an inner and outer ring.

The object of the present invention is to devise an improved form of pistion ring of the above character which may be employed with any ordinary form of piston without necessitating any special construction or arrangement thereof, and the invention consists in the various combinations of parts hereinafter pointed out in the claims.

The invention also comprises the forms of piston ring hereinafter described and illustrated.

The accompanying drawings illustrate two modes of carrying out the invention.

In carrying my invention into effect in one convenient manner I form my improved piston ring with an outer ring *a* of steel or other suitable material and gapped or tongued at one part, as at *b*, and having a dowel or projection *c* on its inner surface opposite to the gap *b* for the purpose of positioning the inner ring *d*. The latter is made of comparatively light section steel or other material and is also gapped, the ends adjacent to the gap being formed as springs or having springs *e* secured thereto such that the spring or springs is or are of substantially the same thickness as the ring and form a continuation of the curve thereof.

The rings are so assembled that the dowel or projection on the inner surface of the outer ring is between the ends of the inner ring which abut against the projection, and when the piston with the ring thereon is introduced into the cylinder the inner ring is compressed and exerts a uniform pressure on the outer ring, thus maintaining the latter in contact with the cylinder wall and effectually preventing leakage.

It will be understood that the spring portions of the inner ring are preferably so made that they do not occupy more space in section than the general section of the ring.

Figure 1:
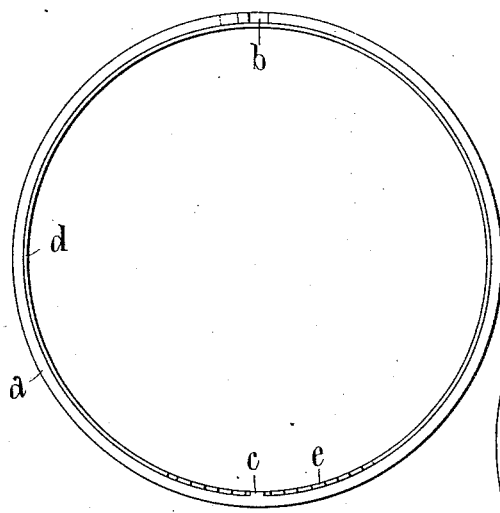
Figures 1, 2 and 3 are respectively a plan, sectional elevation and outside elevation of one form of ring in accordance with the invention.
Figure 4:
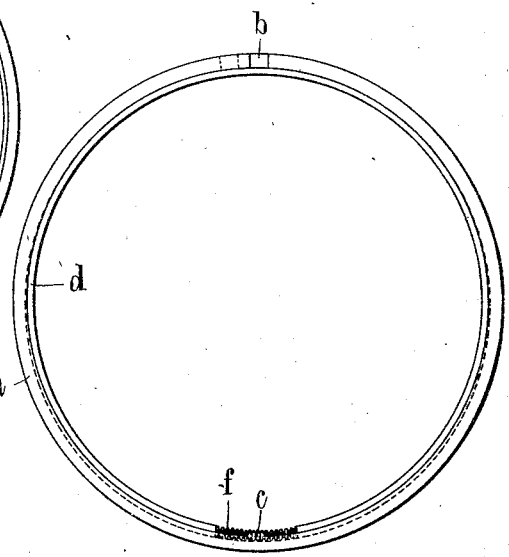
Figures 4, 5 and 6 are similar views showing a modified form of ring.
Figure 2:
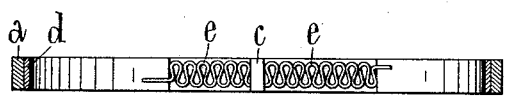
Figure 5:
Figure 3:
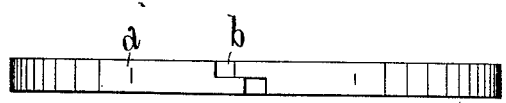
Figure 6:
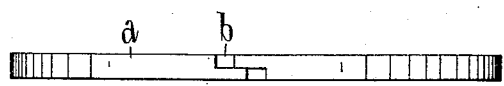

In the modification of the invention shown in Figures 4 to 6 the general arrangement is similar to that above described, but a spring *f* is in this case provided separately from and between the ends of the inner ring, the spring being preferably positioned by means of a channel in the outer ring and further held laterally by the side lugs *c* between which the spring is located.

Having now described my invention what I claim as new and desire to secure by Letters Patent is:—

1. A piston ring comprising in combination an outer ring, a gapped inner concentric ring the ends of which are spaced from each other, spring means arranged in the gap of substantially the same thickness of the inner ring and forming a continuation of the curvature thereof and aligning with the inner periphery thereof, and laterally disposed retention means on the outer ring and located within the gap for preventing displacement of the spring means.

2. A piston ring comprising in combination an outer gapped ring, an inner concentric gapped ring, a spring between the ends of said inner ring and laterally disposed projections upon the outer ring between which the spring is located.

In testimony whereof I have signed my name to this specification.

CHARLES BENJAMIN REDRUP.